United States Patent [19]
Ohkawa et al.

[11] Patent Number: 5,494,008
[45] Date of Patent: Feb. 27, 1996

[54] VALVE TIMING CONTROL APPARATUS FOR ENGINE

[75] Inventors: Nobuhisa Ohkawa; Tadahisa Naganawa, both of Toyota; Kouji Endou, Mizunami; Senji Kato, Aichi; Shigeru Sone; Atsushi Goto, both of Toyota, all of Japan

[73] Assignee: Toyota Jidosha Kabushiki Kaisha, Toyota, Japan

[21] Appl. No.: 301,212

[22] Filed: Sep. 6, 1994

[30] Foreign Application Priority Data

Sep. 9, 1993 [JP] Japan ................................. 5-224524

[51] Int. Cl.⁶ .............................. F01L 1/34; F02D 13/02
[52] U.S. Cl. ................................. 123/90.17; 123/90.15
[58] Field of Search ........................ 123/90.15, 90.16, 123/90.17, 568

[56] References Cited

U.S. PATENT DOCUMENTS

| | | | |
|---|---|---|---|
| 3,714,932 | 2/1973 | Meacham et al. | 123/90.15 |
| 4,117,813 | 10/1978 | Yamashita et al. | 123/90.15 |
| 5,103,780 | 4/1992 | Ishii | 123/90.17 |
| 5,133,310 | 7/1992 | Hitomi et al. | 123/90.15 |
| 5,161,497 | 11/1992 | Simko et al. | 123/90.15 |
| 5,222,465 | 6/1993 | Sakamoto et al. | 123/90.17 |

FOREIGN PATENT DOCUMENTS

| | | |
|---|---|---|
| 4227619 | 2/1993 | Germany . |
| 58-25538 | 2/1983 | Japan . |
| 4183945 | 6/1992 | Japan . |
| 5163970 | 6/1993 | Japan . |
| 5248277 | 9/1993 | Japan . |

Primary Examiner—Weilun Lo
Attorney, Agent, or Firm—Kenyon & Kenyon

[57] ABSTRACT

A varying mechanism (VVT) for continuously varying the valve timing of an intake valve in a predetermined range is provided on a cam shaft in an engine. By controlling the VVT, the valve overlap period of the intake valve and an exhaust valve is continuously varied in a predetermined range, thus adjusting the amount of the internal EGR in combustion chambers. When determining that the operational load of the engine is small and intermediate based on the value of a manifold pressure, an electronic control unit (ECU) computes a target value for advancing the valve timing with respect to the rotational phase of a crankshaft based on a throttle angle, an engine speed, etc. The ECU also computes a limit value to restrict the target value in accordance with the value of the manifold pressure. When the target value is smaller than the limit value, the ECU controls the VVT based on the target value. When the target value is greater than the limit value, the ECU replaces the limit value with target value and controls the VVT based on this target value.

14 Claims, 7 Drawing Sheets

Fig. 2

VALVE TIMING CONTROL APPARATUS FOR ENGINE

BACKGROUND OF THE INVENTION

1. Field of the Invention

The present invention relates generally to a valve timing control apparatus which controls the timing of at least one of the intake valve and exhaust valve of an engine. More particularly, this invention relates to a valve timing control apparatus which controls the amount of the valve overlap of the intake valve and exhaust valve in accordance with the running condition of an engine.

2. Description of the Related Art

In the conventional combustion engine, intake and exhaust valves respectively operate to open and close air-intake and exhaust passages connected to the individual combustion chambers. The timing of both valves, likewise that of the pistons, is controlled by the rotational phase of the crankshaft. As shown in FIGS. 8(a) and 8(b), during a cycle where the crankcase angle changes 720 degrees, a short period of time exists when both valves of a cylinder open at the same time. This so called valve overlap helps to scavenge burned gases out of the cylinder and to pull fresh air and fuel into the cylinder. Consequently, the amount of intake or exhaust gas in any one of the combustion chambers depends on the angle of a throttle valve provided in the engine's air-intake passage, or more specifically, on the speed of the engine at any particular time.

Various apparatuses are available to ensure a variable valve timing in order to control the amount intake and exhaust amounts in the combustion chamber with a greater degree of freedom. Japanese Unexamined Patent Publication No. 58-25538 discloses one example of such an apparatus. As illustrated in FIG. 9, an injector 92 provided in an air-intake passage 93 of an engine 91 injects fuel into the passage 93. An intake valve 96 and an exhaust valve 97 respectively open, allowing communication between a combustion chamber 94, the air-intake passage 93 and an exhaust passage 95. Actuators 98 and 99 drive the valves 96 and 97 respectively. A computer 100 controls the driving of the injector 92 based on various parameters detected by individual sensors 101, 102 and 103, and in this way adjusts the amount of fuel injected into the air-intake passage 93. Based on various engine operating parameters, the computer 100 also controls the driving of the individual actuators 98 and 99. This in turn effects the timing control of the valves 96 and 97.

Through the above control, the computer 100 controls the adjustment of the air-fuel mixture, supplied to the combustion chamber 94, and thereby controls the output of the engine 91. Under conditions when the engine's speed is substantially constant, the computer 100 controls the overlap of the intake and exhaust valves 96, 97 in such a way that allows exhaust gas to recirculate into the combustion chamber 94. The purpose of such Exhaust Gas Recirculation (EGR) is to reduce the amounts of nitrogen oxide contained in the exhaust gas exhausted to the atmosphere. In conventional engine systems, such control could also be carried out based on engine load rather than engine speed.

Usually, however, when the engine 91 has a small load, the amount of air fed into the combustion chamber 94 is itself relatively small, resulting in unstable combustion of the air-fuel mixture in the combustion chamber 94. Therefore, unburnt gas is likely to be left over after combustion in the combustion chamber 94. This tends to increase the level of engine emissions, i.e., exhaust emissions. A simple increase of the valve overlap to enhance the effect of the internal EGR operations increases, in this situation the amount of exhaust gas blown back to the air-intake passage 93 from the combustion chamber 94. Should too much exhaust gas be blown back into the air-intake passage 93, unstable air-fuel combustion occurs resulting in engine misfirings and increases to the engine's emission output. Even with intermediate engine loads, setting the valve overlap to a relatively large valve or amount often causes engine misfirings and subsequent increases to the amounts of engine emissions exhausted to the atmosphere. This is the case irrespective of whether the air-fuel mixture is burned properly in the combustion chamber 94.

SUMMARY OF THE INVENTION

Accordingly, it is a primary objective of the present invention to provide a valve timing control apparatus, which effectively purges exhaust gas through the engine's internal EGR in accordance with variations in the engine load and which prevents engine misfires from occurring due to the internal EGR.

To achieve the above and other objects and in accordance with the purpose of the present invention, a valve timing control apparatus for an engine is provided. The apparatus has an air-intake passage for introducing air to a combustion chamber and an air-exhaust passage for exhausting gas from the combustion chamber, both passages respectively having an intake valve and an exhaust valve therein, said intake and exhaust valves alternately and selectively opening and closing, and simultaneously opening during a valve overlap period, in synchronism with a rotation of a crankshaft to join the passages with the combustion chamber. The apparatus controls a valve opening timing of the intake valve and/or the valve opening timing of the exhaust valve in accordance with a running condition of the engine.

The apparatus includes a device for continuously varying the valve timing of the intake valve and/or the valve timing of the exhaust valve, a detecting device for detecting a running condition of said engine, a computing device for computing a target value of the valve timing to be controlled, based on the detected running condition of the engine, and a control device for controlling the varying device to continuously alter the valve overlap period of the intake valve and the exhaust valve based on the computed target value.

The apparatus further includes a restricting device for restricting said target value to be computed by said computing device for keeping an amount of exhaust gas returning into the combustion chambers during the valve overlap period less than a predetermined value according to the detected running condition of the engine.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 1 through 7 illustrate one embodiment of the present invention as applied to the engine of a vehicle.

FIG. 1 is a schematic structural diagram illustrating a valve timing control apparatus for an engine;

FIG. 2 is a cross section showing the structures of a variable valve timing mechanism (VVT), etc.;

FIG. 3 is a cross section also showing the structures of the VVT, etc.;

FIG. 4 is a block diagram showing the structures of an electronic control unit (ECU), etc.;

FIG. 6 is a flowchart illustrating a "valve timing control routine" executed by the ECU; and FIG. 7 is a map showing the relation between a manifold pressure and a limit value.

DETAILED DESCRIPTION OF THE PREFERRED EMBODIMENT

A detailed description will now be given of a valve timing control apparatus for an engine according to one embodiment of the present invention as applied to a gasoline engine of a vehicle with reference to FIGS. 1 through 7.

Figure 1:
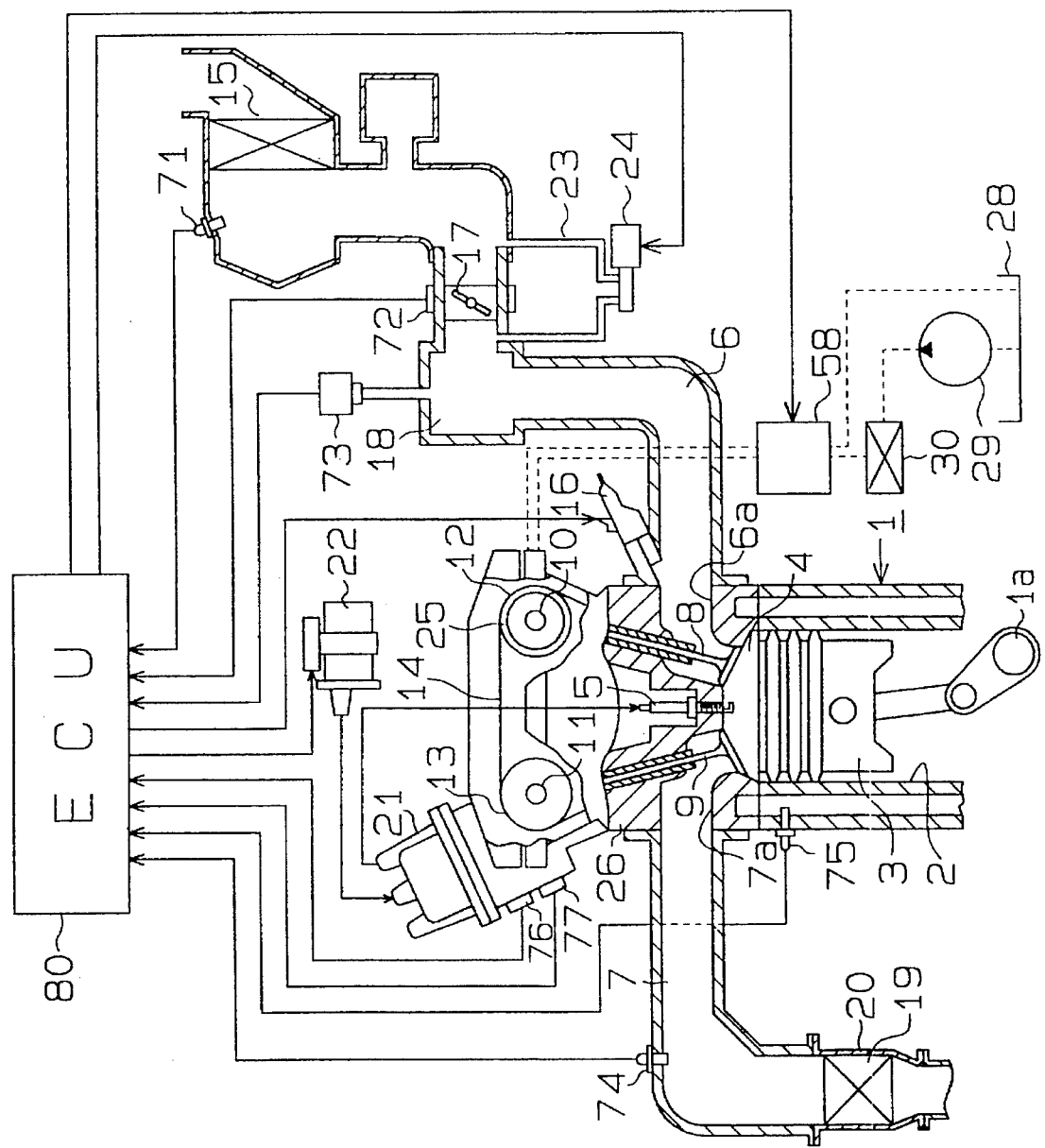

FIG. 1 illustrates the schematic structure of a valve timing control apparatus for an engine. An engine 1 has a plurality of cylinders 2 in which pistons 3 reciprocate. Each cylinder 2 has a combustion chamber 4 located above the piston 3. A plurality of ignition plugs 5 are provided in association with the individual combustion chambers 4. An air-intake passage 6 and an exhaust passage 7 communicate with each combustion chamber 4 via an intake port 6a and an exhaust port 7a, respectively. An intake valve 8 and an exhaust valve 9 provided in association with each combustion chamber 4 respectively open the ports 6a and 7a. Those valves 8 and 9 function based on the rotations of different cam shafts 10 and 11. Timing pulleys 12 and 13 are respectively provided at the distal ends of the cam shafts 10 and 11. Those pulleys 12 and 13 are drivably coupled to a crankshaft 1a by a timing belt 14.

Figure 8A:
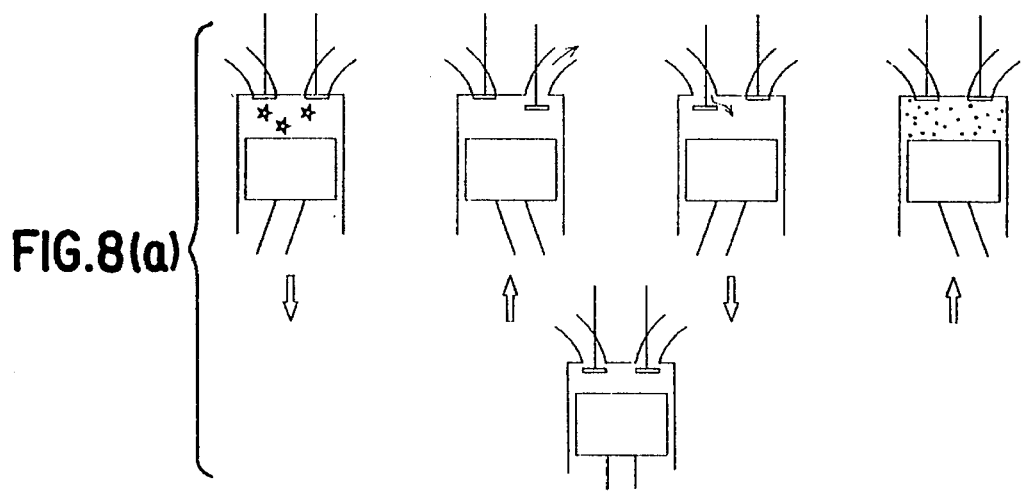
FIGS. 8(a) and 8(b) graphically illustrate the period of time when both intake and exhaust valve overlap.
Figure 8B:
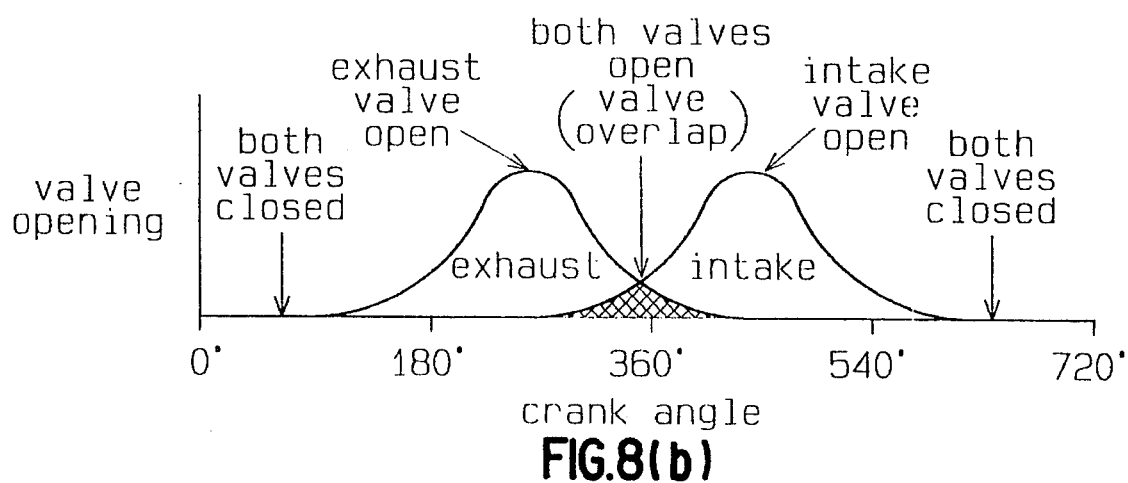
Figure 9:
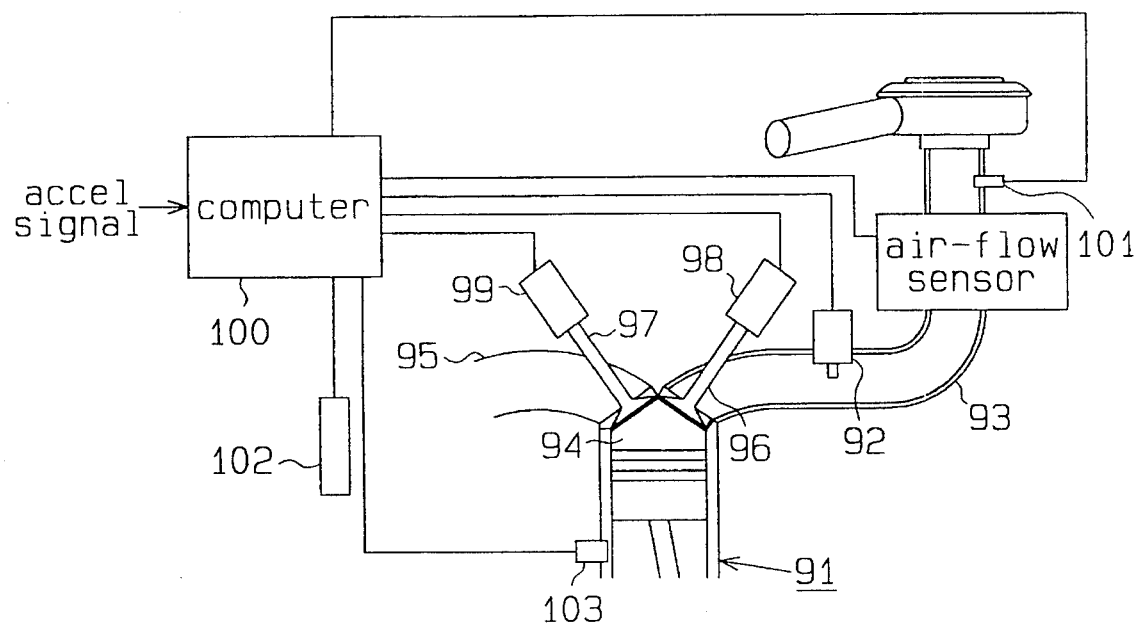
FIG. 9 is a schematic structural diagram showing a conventional apparatus.

When the engine 1 runs, therefore, the torque of the crankshaft 1a is transmitted via the timing belt 14 as well as the timing pulleys 12 and 13 to the cam shafts 10 and 11. Based on the rotations of the cam shafts 10 and 11, the valves 8 and 9 are opened or closed. The valves 8 and 9 can function at predetermined timings in synchronism with the rotation of the crankshaft 1a or in synchronism with the suction stroke, the compression stroke, the combustion and expansion stroke, and the exhaust stroke according to the up and down reciprocal movement of each piston 3, as illustrated in FIGS. 8(a) and 8(b).

An air cleaner 15 provided at the inlet side of the air-intake passage 6 cleans the outside air taken into the air-intake passage 6. Injectors 16 provided near the respective intake ports 6a inject fuel into the air-intake passage 6. When the engine 1 runs, the air is supplied via the air cleaner 15 into the air-intake passage 6. Fuel injected from each injector 16 is then mixed with the air and fed into the associated combustion chamber 4. This occurs when the associated intake port 6a is opened by the intake valve 8 in the suction stroke. The air-fuel mixture supplied into the combustion chamber 4 is ignited and burned by the associated ignition plug 5. As a result, the piston 3 moves to rotate the crankshaft 1a, generating the driving power in the engine 1. After combustion of the air-fuel mixture, the exhaust gas is discharged out of the combustion chamber 4 via the exhaust passage 7. This occurs when the exhaust port 7a is opened by the exhaust valve 9 in the exhaust stroke.

A throttle valve 17 provided midway in the air-intake passage 6 functions in response to the manipulation of an acceleration pedal (not shown). The amount of air taken into the air-intake passage 6, i.e., the air-intake amount can be controlled by adjusting the angle of this valve 17. A surge tank 18 provided downstream of the throttle valve 17 smoothes the suction pulsation. An air temperature sensor 71 provided in the vicinity of the air cleaner 15 detects an intake-air temperature THA. A throttle sensor 72 provided in the vicinity of the throttle valve 17 detects the angle, TA, of the valve 17 (throttle angle). A manifold pressure sensor 73 provided in the surge tank 18 detects a manifold pressure PM.

A catalytic converter 20, provided in a midway of the exhaust passage 7, cleans the exhaust gas with an incorporated catalytic converter rhodium 19. An oxygen sensor 74 provided in a midway of the exhaust passage 7 detects the oxygen density in the exhaust gas. A coolant temperature sensor 75 detects the temperature, THW, of the coolant in the engine 1.

A distributor 21 distributes an ignition signal to ignite the individual ignition plugs 5. The distributor 21 distributes a high voltage, output from an igniter 22, to the individual ignition plugs 5 in synchronism with the rotation of the crankshaft 1a or a change in crank angle. Therefore, the ignition timing of each ignition plug 5 is determined by the timing at which a high voltage is output from the igniter 22.

A rotor (not shown) incorporated in the distributor 21 rotates in synchronism with the rotation of the crankshaft 1a via the cam shaft 11. An engine speed sensor 76 provided in the distributor 21 detects the rotational speed of the engine 1 (engine speed) NE. A timing sensor 77 provided in the distributor 21 detects the reference position, GP, of the crank angle at a predetermined rate in accordance with the rotation of the rotor. In this embodiment, the crankshaft 1a rotates twice for a sequence of operational strokes of the engine 1, and the engine speed sensor 76 detects the crank angle at a rate of 30 degrees per pulse. The timing sensor 77 detects the crank angle at a rate of 360 degrees per pulse.

In this embodiment, a bypass passage 23 provided in the air-intake passage 6 bypasses the throttle valve 17 and connects the upstream side of the valve 17 to the downstream side. An idle speed control valve (ISCV) 24 of a linear solenoid type provided in the bypass passage 23 serves to stabilize the idling at which time the throttle valve 17 is fully closed. Based on the actuation of the ISCV 24, the degree of the opening of the bypass passage 23 is adjusted to control the amount of air led into the combustion chamber 4.

In this embodiment, a variable valve timing mechanism (hereinafter referred to as "VVT") 25, which is driven by the hydraulic pressure, is provided in the timing pulley 12 to make the actuation timing of the intake valve 8 variable.

Figure 2:
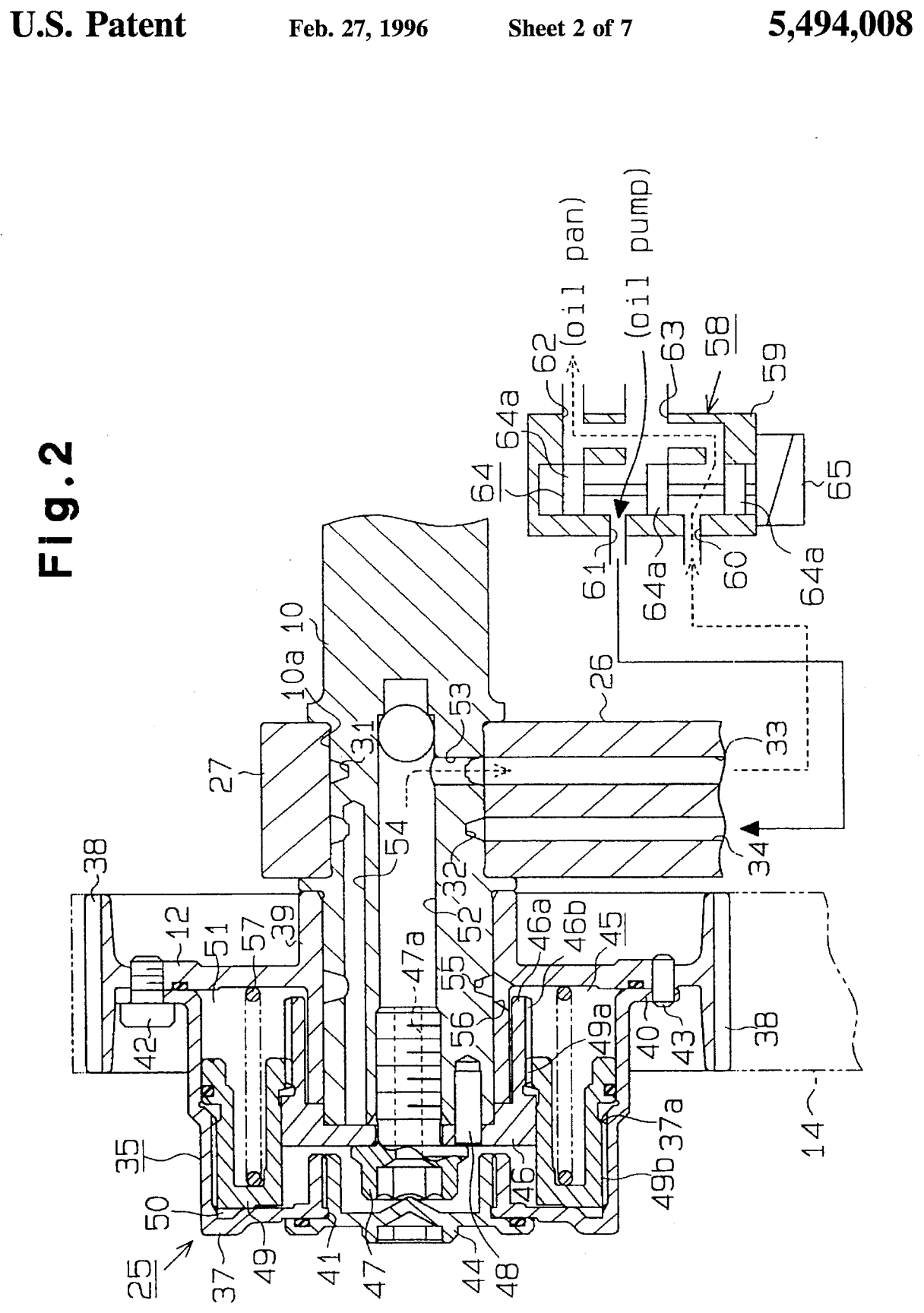
Figure 3:
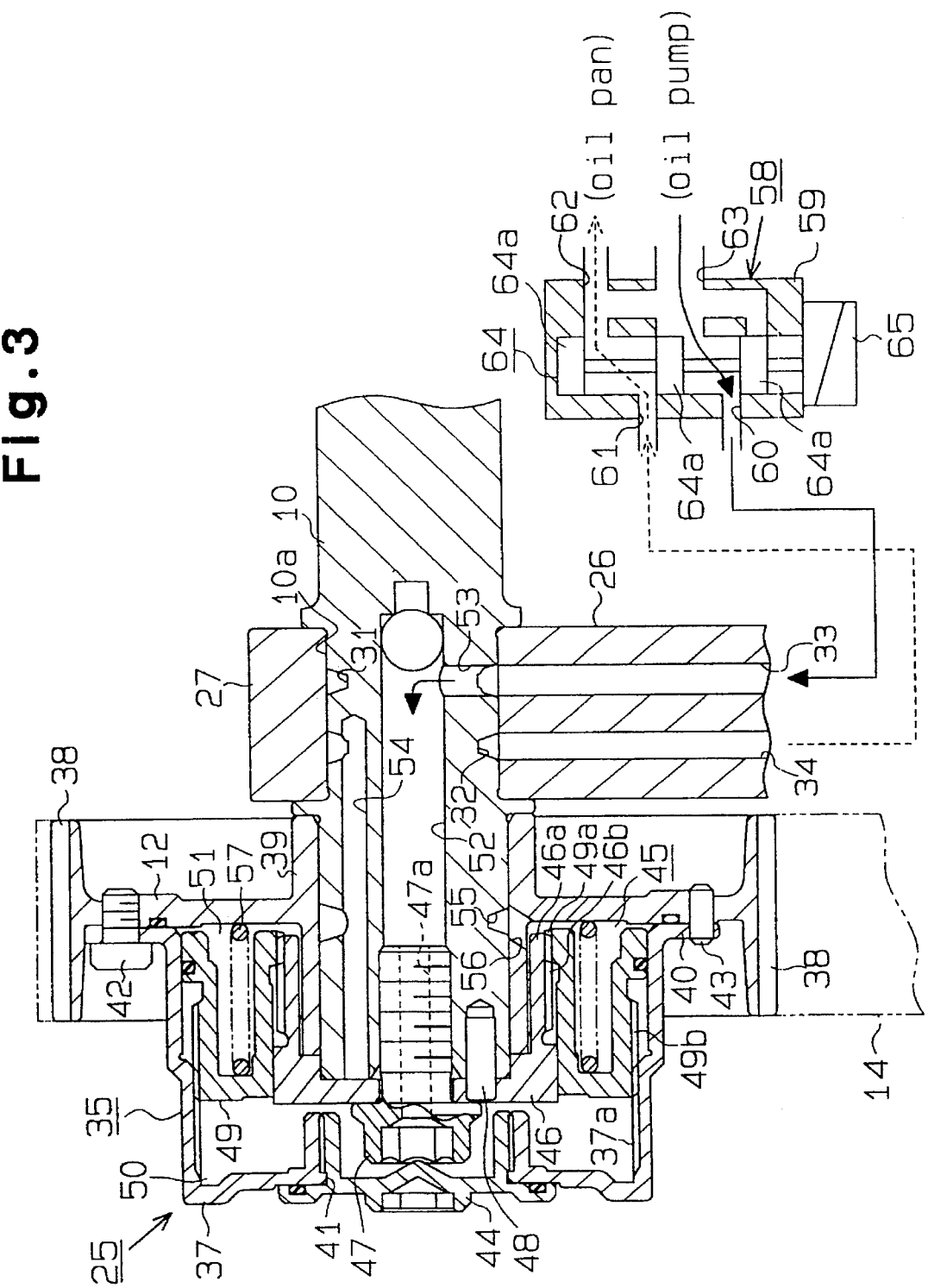

The structure of the VVT 25 will be described below in detail with reference to FIGS. 2, 3, 5A and 5B. FIGS. 2 and 3 show the structure of the VTT 25. A journal 10a of the cam shaft 10 is rotatably supported between a cylinder head 26 and a bearing cap 27 of the engine 1. The VVT 25 is integrally provided with the timing pulley 12 at the distal end of the cam shaft 10. Two journal grooves 31 and 32 provided in the journal 10a extend along the outer surface of the journal 10a. First and second head oil passages 33 and 34, provided in the cylinder head 26, serve to supply a lubricating oil to the journal 10a and the grooves 31 and 32. In this embodiment, an oil pan 28, an oil pump 29 and an oil filter 30, provided in the engine 1, constitute a lubricating apparatus for the engine 1, as shown in FIG. 1.

During the engine's operation of the oil pump 29, lubricating oil is pumped up from the oil pan 28 and discharged out of the pump 29. After passing through the oil filter 30, the oil passes through the oil passages 33 and 34 under a predetermined pressure and is then supplied to the journal 10a and the grooves 31 and 32.

A pulley housing 35 provided at the distal end of the cam shaft 10 has the timing pulley 12 and a cover 37. The cover 37, attached to the pulley 12, covers one side of the pulley 12 and the distal end of the cam shaft 10. The substantially disk shaped pulley has a plurality of external teeth 38 on its outer surface and a boss 39 in its center. The pulley 12, attached to the cam shaft 10 by the boss 39, is movable relative to the shaft 10. The aforementioned timing belt 14 is attached to the external teeth 38.

The cylindrically shaped cover 37, open at one end substantially closed at its base portion, has a flange 40 on its outer surface and a communication hole 41 formed in the center of its base portion. The cover 37 further has a plurality of internal teeth 37a on the inner surface. The flange 40 is secured to one side of the pulley 12 by a plurality of bolts 42 and pins 43. A detachable lid 44 is secured to the communication hole 41.

In a space 45, defined by the pulley 12 and the cover 37, a cylindrical inner cap 46 attaches to the distal end of the cam shaft 10 by a hollow bolt 47 in such a way that pin 48 prevents the cap 46 from rotating. The cap 46 has a wall 46a surrounding the boss 39 and is rotatable in relative to the boss 39. The wall 46a has a plurality of external teeth 46b on its outer surface.

A ring gear 49 is disposed between the pulley housing 35 and the cam shaft 10 to couple the housing 35 and the cam shaft 10. More specifically, the ring gear 49 disposed in the space 45 has an annular shape and can reciprocate along the axial direction of the cam shaft 10. This gear 49 has a plurality of teeth 49a and 49b arraigned in a helical form on the inner and outer surfaces. As this gear 49 moves in the axial direction along the cam shaft 10, it rotates in relative to the shaft 10. The inner teeth 49a of the gear 49 engage with the outer teeth 46b of the inner cap 46, and the outer teeth 49b engage with the inner teeth 37a of the cover 37.

As the pulley housing 35 is rotated by the timing belt 14, therefore, the pulley housing 35 and inner cap 46, coupled by the ring gear 49, rotate together and the cam shaft 10 and the pulley housing 35 also rotate together.

As shown in FIGS. 2 and 3, first and second hydraulic pressure chambers 50 and 51 are provided in the space 45, sandwiching the ring gear 49. The first hydraulic pressure chamber 50 is located between the left end of the ring gear 49 and the bottom of the cover 37 while the second hydraulic pressure chamber 51 is located between the right end of the ring gear 49 and the pulley 12.

To transmit the hydraulic pressure of the lubricating oil to the first hydraulic pressure chamber 50, a first shaft oil passage 52 extends in the axial direction along the cam shaft 10. The distal end side of this oil passage 52 is connected to the first hydraulic pressure chamber 50 via a center hole 47a of the hollow bolt 47. The proximal end of this oil passage 52 extends in the radial direction of the cam shaft 10 and is connected to the journal groove 31 via an oil hole 53.

To transmit the hydraulic pressure of the lubricating oil to the second hydraulic pressure chamber 51, a second shaft oil passage 54 extends parallel to the first shaft oil passage 52 in the cam shaft 10. One round groove 55 formed at the distal end side of the cam shaft 10 extends along the outer surface of the shaft 10. A part of this round groove 55 is connected to the second shaft oil passage 54. An oil hole 56 formed in a part of the boss 39 connects the ground groove 55 to the second hydraulic pressure chamber 51. The proximal end of the second oil passage 54 is connected to the other journal groove 32. In the second hydraulic pressure chamber 51, a spring 57 intervening between the ring gear 49 and the pulley 12 urges the gear 49 toward the initial position shown in FIG. 2.

With the above structure, the first head oil passage 33, the oil hole 53, the first shaft oil passage 52 and the center hole 47a constitute a hydraulic pressure supplying passage for supplying the hydraulic pressure to the first hydraulic pressure chamber 50. Further, the second head oil passage 34, the second shaft oil passage 54 and the oil hole 56 constitute a hydraulic pressure supplying passage for supplying the hydraulic pressure to the second hydraulic pressure chamber 51. Linear solenoid valves (LSV's) 58 provided in the individual hydraulic pressure supplying passages, connected to the individual head oil passage 33 and 34, control the supply of the hydraulic pressure to the hydraulic pressure chambers 50 and 51. The LSV 58 is an electromagnetic type four-way valve, which is connected to the oil pan 28, oil pump 29 and oil filter 30, as shown in FIG. 1.

As shown in FIGS. 2 and 3, when casing 59 constituting the LSV 58 has first to fourth ports 60, 61, 62 and 63. The first port 60 communicates with the first head oil passage 33, and the second port 61 communicates with the second head oil passage 34. The third port 62 communicates with the oil pan 28, and the fourth port 62 communicates with the discharge side of the oil pump 29 via the oil filter 30. A tandem type spool 64 provided inside the casing 59 has three cylindrical valves 64a and can reciprocate in the axial direction. This spool 64 is also movable between a first actuation position shown in FIG. 2 and a second actuation position shown in FIG. 3, based on the action of an electromagnetic solenoid 65 also provided in the casing 59.

As shown in FIG. 3, when the spool 64 of the LSV 58 moves to the second actuation position, the discharge side of the oil pump 29 connects to the first head oil passage 33 while the second head oil passage 34 connects to the oil pan 28. With the spool 64 at this position, the hydraulic pressure is supplied to the first hydraulic pressure chamber 50. This hydraulic pressure, together with the pressure of the lubricating oil remaining in the second hydraulic pressure chamber 51, causes the ring gear 49 to rotate while moving in the axial direction against the urging force of the spring 7. The oil pressure provides the rotational phase difference between the cam shaft 10 and the pulley housing 35. Here, the rotational phase of the cam shaft 10 leads that of the housing 35. As a result, the timing of the intake valve 8 leads the rotational phase of the crankshaft 1a.

Figure 5A:
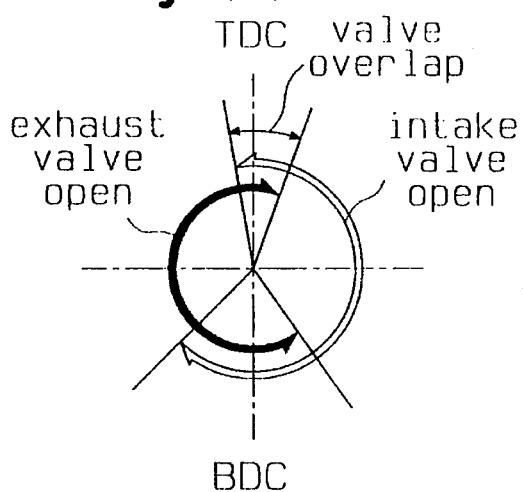
FIG. 5(a) is an explanatory diagram showing the valve overlap between an intake valve and an exhaust valve.
Figure 5B:
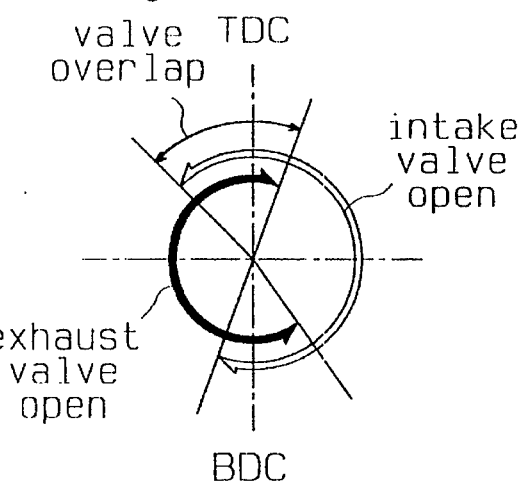
FIG. 5(b) is an explanatory diagram further illustrating valve overlap.

In this case, advancement to the timing of intake valve 8 results in an increase in valve overlap between the intake valve 8 and exhaust valve 9 during the suction stroke, as shown in FIG. 5(b). Consequently, when the hydraulic pressure is supplied to the first hydraulic pressure chamber 50, the ring gear 49 moves to the end position in close proximity to the timing pulley 12 as shown in FIG. 3. With the gear 49 moved to this position, the timing of the intake valve 8 is advanced to a maximum. The valve's advancement is graphically illustrated in FIGS. 5(a) and 5(b). FIG.

5(a) illustrates a state where valve 8 is relatively retarded while FIG. 5(b) represents a state where the valve 8 is relatively advanced, i.e., when gear 49 is at its end position.

When the gear 49 is moved away from timing pulley 12, the spool 64 of the LSV 58 moves to the first actuation position, as shown in FIG. 2. The discharge side of the oil pump 29 then connects to the second head oil passage 34 and the first head oil passage 33 connects to the oil pan 28. With the spool 64 at this position, the hydraulic pressure is supplied to the second hydraulic pressure chamber 51. This hydraulic pressure causes the ring gear 49 to rotate while moving in the axial direction against the pressure of the lubricating oil remaining in the first hydraulic pressure chamber 50. This provides the rotational phase difference between the cam shaft 10 and the pulley housing 35 in the opposite direction to that of the previous case. Here, the rotational phase of the cam shaft 10 lags from that of the housing 35. As a result, the timing of the intake valve 8 lags from the rotational phase of the crankshaft 1a, as shown in FIG. 5(a).

With the timing of valve 8 retarded, a decrease occurs in the valve overlap of the intake valve 8 and exhaust valve 9 during the suction stroke, also shown in FIG. 5(a). Consequently, the hydraulic pressure is supplied to the second hydraulic pressure chamber 51, the ring gear 49 moves to the end position close in proximity to the cover 37 as shown in FIG. 2. With the gear 49 moved to this position, the timing of the intake valve 8 is retarded to a maximum degree as shown in FIG. 5(a).

Through the means of VVT 25 as described above timing of the intake valve 8 and thus the valve overlap of the intake valve 8 and the exhaust valve 9 changes continuously and variably in the range as shown in FIG. 5(a) and FIG. 5(b).

As shown in FIG. 1, an electronic control unit (hereinafter simply called "ECU") 80 receives signals detected by the air temperature sensor 71, the throttle sensor 72, the manifold pressure sensor 73, the oxygen sensor 74, the coolant temperature sensor 75, the engine speed sensor 76 and the timing sensor 77. Based on the detection signals, the ECU 80 properly controls the driving of the individual injectors 16, the igniter 22, the ISCV 24 and the LSV 58.

Figure 4:
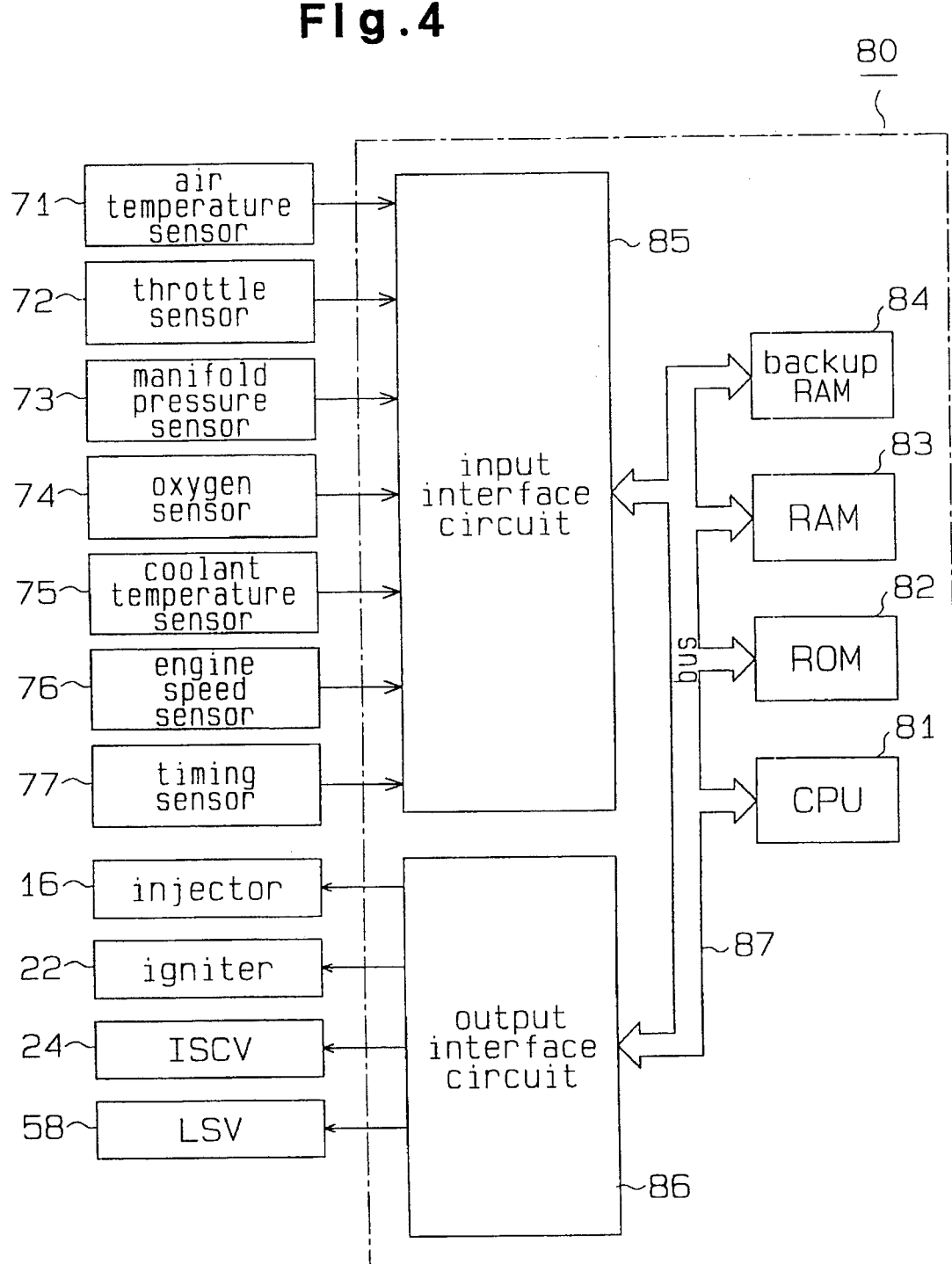

The ECU 80 comprises a central processing unit (CPU) 81, a read only memory (ROM) 82, a random access memory (RAM) 83 and a backup RAM 84 as shown in a block diagram in FIG. 4. The ECU 80 has those components 81–84 connected to an input interface circuit 85 including an A/D converter and an output interface circuit 86 by a bus 87, all of which form an arithmetic logic unit. Predetermined control programs, etc. are previously stored in the ROM 82. The RAM 83 temporarily stores the results of the operations performed by the CPU 81. The backup RAM 84 holds previously stored data. The aforementioned individual sensors 71 to 77 are connected to the input interface circuit 85, and the aforementioned components 16, 22, 24 and 58 to the output interface circuit 86.

The CPU 81 reads the signals from the sensors 71–77, input via the input interface circuit 85, as input values. Based on the input values, the CPU 81 properly controls the driving of the individual components 16, 22, 24, 58, etc. to execute various controls, such as the fuel injection control, ignition timing control, idle speed control and valve timing control.

The fuel injection control regulates the driving of the injectors 16 based on a target value computed in accordance with the running condition of the engine 1. In this way the amount of fuel supplied to each combustion chamber 4 is accurately controlled. The ignition timing control regulates the driving of the igniter 22 based on a target value computed in accordance with the running condition of the engine 1 and thereby controls the timing of each ignition plug 5. The idle speed control carries out feedback control on the angle of the ISCV 24 so that the value of the actual engine speed NE matches with the target value. The valve timing control regulates the driving of the LSV 58 to actuate the VVt 25 based on a target value computed in accordance with the running condition of the engine 1. This allows for the control of the actuation timing of the intake valve 8 and eventually the valve overlap.

Figure 6:
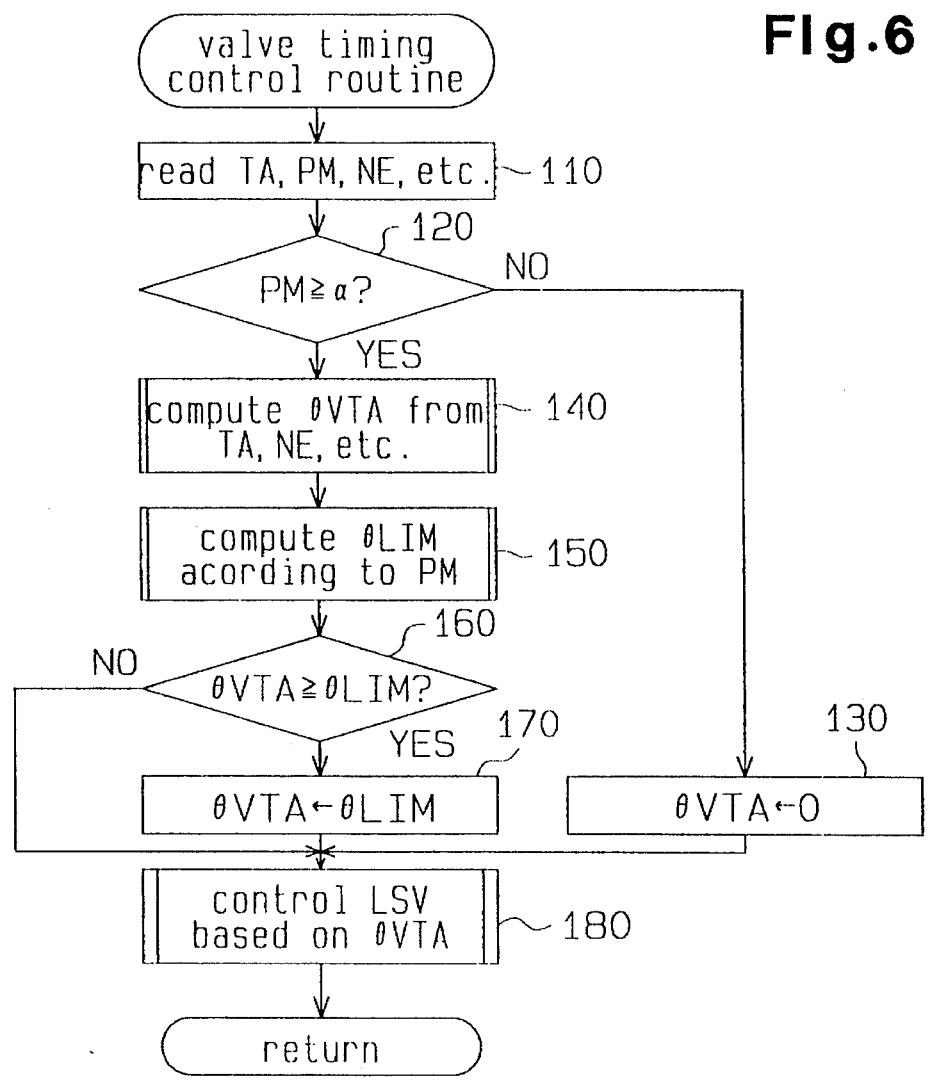
Figure 7:
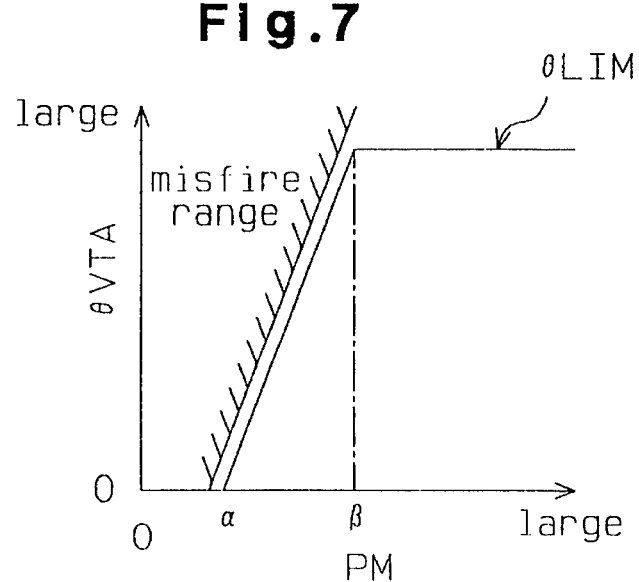

Of those various controls executed by the ECU 80, the contents of the valve timing control will be described with reference to FIGS. 6 and 7. FIG. 6 presents a flowchart illustrating a "valve timing control routine" that is executed when the engine 1 runs. The ECU 80 executes this routine through an interruption made during every predetermined cycle of operation.

When the process enters this control routine, first, the ECU 80 receives input values associated with the throttle angle TA, manifold pressure PM, engine speed NE, etc. which reflect the detection values from the individual sensors 72, 73, 76, etc. at step 110.

Next, the ECU 80 determines if the input value of the current manifold pressure PM is equal to or greater than a predetermined reference value α at step 120. This reference value α corresponds to a limiting value used by the ECU 80 to define a small engine load during idle conditions. The reference value α may be for example set to "150 mmHgbs". When the input value of the manifold pressure PM is not equal to or above the reference value α, that indicates the operational load of the engine 1 is very small. Under these conditions the ECU 80 moves to step 130.

At this step 130, the ECU 80 sets the target value ΘVTA for the valve timing control to "0 degrees" so that the valve timing does not lead with respect to the rotational phase of the crankshaft 1a, and then proceeds to step 180. The set target value ΘVTA in this way corresponds to a value at which the valve timing lags most in relation to the rotational phase of the crankshaft 1a.

When the input value of the manifold pressure PM is equal to or above the reference value α at step 120, which indicates that the operational load of the engine 1 is not small, the ECU 80 goes to step 140.

At this step 140, the ECU 80 computes the target value ΘVTA according to the current engine running conditions, based on currently read input values of the throttle angle TA, engine speed NE and so forth. The ECU 80 calculates the target value ΘVTA based on the target value ΘVTA is previously set in accordance with the levels of the throttle angle TA, engine speed NE and so forth. In this embodiment, the characteristic of the first map is set in such a way that when the engine 1 runs under a high load and at a high speed, the amount of air to be supplied in the combustion chamber 4 increases based on the inertia effect of air suction. In other words, the characteristic of the first map is set in such a way that when the engine 1 runs under a high load and at a high speed, the target value ΘVTA becomes large and the valve overlap increases. It is known that the valve overlap causes the exhaust gas to be led into the combustion chamber 4 again (internal EGR), thus reducing nitrogen oxide in the exhaust gas. In this embodiment, therefore, the characteristic of the first map is set in such a way as to ensure the proper amount of internal EGR in accordance with the operational load of the engine 1.

At the next step 150, the ECU 80 computes a limit value ΘLIM as a threshold value in accordance with the currently read input value of the manifold pressure PM. This limit value ΘLIM is what has experimentally been obtained in advance as a value that does not exceed a predetermined value according to the operational load of the engine 1. The predetermined value corresponds to the amount of the internal EGR when engine misfires occur in the combustion chamber 4 due to the internal EGR. The ECU 80 computes this limit value ΘLIM referring to a map previously determined in accordance with the manifold pressure PM as shown in FIG. 7.

According to this embodiment, the characteristic of the map is such that when the value of the manifold pressure PM becomes smaller than the reference value α, i.e., when the operational load of the engine 1 is very small, the target value ΘVTA becomes "0". When the operational load of the engine 1 is small or at about the intermediate level (the manifold pressure PM is smaller than a predetermined value B), the limit value ΘLIM increases as the value of the manifold pressure PM increases. When the operational load of the engine 1 is at the intermediate or high level, the limit value ΘLIM becomes constant regardless of the value of the manifold pressure PM.

At the subsequent step 160, the ECU 80 determines if the currently obtained target value ΘVTA is equal to or greater than the currently obtained limit value ΘLIM. When the target value ΘVTA is less than the limit value ΘLIM, the ECU 80 determines that the target value ΘVTA is not greater than it needs to be and that engine misfiring will not occur in the combustion chamber 4 from the valve-overlap oriented internal EGR. Following this the ECU 80 proceeds to execute the instruction set at step 180.

When the target value ΘVTA is equal to or greater than the limit value ΘLIM at step 160, the ECU 80 determines that the target value ΘVTA is greater than necessary and that misfires may occur in the combustion chamber 4 from the valve-overlap oriented internal EGR. Next, at step 170, the ECU 80 sets the currently obtained limit value ΘLIM as the target value ΘVTA. In other words, the currently obtained target value ΘVTA is based on the limit value ΘLIM.

In moving to step 180 from either step 130, 160 or 170, the ECU 80 controls the driving of the LSV 58 based on the target value ΘVTA to properly adjust the valve overlap. The ECU 80 executes the valve timing control in the above described manner.

A description will now be given regarding the operation and advantages of the valve timing control apparatus with the above structure. When the engine 1 runs, the individual valves 8 and 9 operate to open and close the individual ports 6a and 7a in synchronism with the rotational phase of the crankshaft 1a. This opening and closing action allows for the engine's air-fuel mixture to be suctioned into the individual combustion chambers 4 and to be exhausted after combustion.

The valve timing of the intake valve 8 is controlled in accordance with the running condition of the engine 1. That is, the target value ΘVTA for the valve timing control is computed by the ECU 80 based on the input values, such as the throttle angle TA and the engine speed NE. The ECU 80 controls the VVT 25 based on this computed value. In this control, the actuation timing of the intake valve 8 is changed continuously and variably in a predetermined range according to the engine's operating conditions. Consequently, valve overlap variably and continuously changes within a predetermined range during engine operation.

With this valve overlap control, the supply of air and fuel to the engine can be performed with greater efficiency.

Consequently, when the engine 1 runs with a high load and at a high speed, the output of the engine 1 can be effectively increased. This valve overlap control further improves internal EGR operation, allowing the proper amount of the exhaust gas discharged from the combustion chamber 4 to be fed back to the combustion chamber 4. Consequently, nitrogen oxide level can be reduced by level not yet achieved in conventional EGR systems.

In addition, when the ECU 80 determines the final target value ΘVTA used to control the VVT 25, it does so based on the operational load of the engine 1. More specifically, when the engine 1 is in an idling status, the operational load of the engine 1 is very small. The target value ΘVTA is set to "0". This in turn, sets the valve overlap to a minimum. As a result, the amount of the internal EGR based on the valve overlap is suppressed as much as possible to prevent engine misfirings and consequent high levels of exhaust emissions.

When the operational load of the engine 1 is small or intermediate, the valve overlap is set by computing the target value ΘVTA using the limit value ΘLIM, obtained according to the operational load at the time of the computation, as an upper limit. The amount of the valve-overlap controlled internal EGR in the engine 1 is controlled so that it does not exceed a predetermined value above which misfires tend to occur. This prevents the amount of the internal EGR from becoming excessively large. It is therefore possible to reduce nitrogen oxide in the exhaust gas based on the amount of the internal EGR that is set according to the operational load of the engine 1, thus ensuring the effective exhaust purging. In addition, it is possible to prevent misfire from occurring in the combustion chamber 4 and to thereby reduce the levels of exhaust emissions when the operational load of the engine 1 is very small.

Although only one embodiment of the present invention has been described herein, it should be apparent to those skilled in the art that the present invention may be embodied in many other specific forms without departing from the spirit or scope of the invention. Particularly, it should be understood that this invention may be embodied in the following modes.

The VVT 25, which is driven with the hydraulic pressure as the driving source, is provided to continuously and variably change the timing of the intake valve 8 within a predetermined range according to the above-described embodiment. Alternatively, a VVT which is driven by an actuator, such as a step motor, as the driving source, may be provided.

In the above embodiment, manifold pressure PM is detected and used as a parameter to compute the target value ΘLIM according to the running condition of the engine 1. In place of the detected manifold pressure PM, a detected amount of intake air may be used as a parameter to compute the target value ΘLIM.

In this embodiment, valve overlap is controlled by changing only the timing of the intake valve 8 by means of the VVT 25 provided on the cam shaft 10 of the cam shaft pair 10 and 11. The valve overlap may also be controlled by providing a VVT on the cam shaft 11 of the cam shaft pair to drive and control the timing of the exhaust valve 9. Alternatively, a VVT may be provided on each of the cam shafts 10 and 11 to drive and control the timing of both the valves 8 and 9. Valve overlap could thus be properly maintained by changing the timing of both VVT controlled valves 8,9.

Therefore, the present examples and embodiment are to be considered as illustrative and not restrictive and the invention is not to be limited to the details given herein, but may be modified within the scope of the appended claims.

What is claimed is:

1. A valve timing control apparatus for an engine having an air-intake passage for introducing air to a combustion chamber and an air-exhaust passage for exhausting gas from the combustion chamber, wherein the air-intake passage includes an intake valve and wherein the air-exhaust passage includes an exhaust valve therein, said intake and exhaust valves alternately and selectively opening and closing, and wherein the intake valve and the exhaust valve are simultaneously open during a valve overlap period, in synchronism with a rotation of a crankshaft to join the passages with the combustion chamber, wherein said apparatus controls at least one of a valve opening timing of the intake valve and a valve opening timing of the exhaust valve in accordance with a running condition of the engine, said apparatus comprising:

means for continuously varying at least one of the valve timing of the intake valve and the valve timing of the exhaust valve;

a throttle valve disposed in the air-intake passage, for controlling an amount of the air flowing into the combustion chamber;

a first sensor for detecting an angle of the throttle valve;

a second sensor for detecting a rotational speed of the engine;

a third sensor for detecting a manifold pressure in the air-intake passage;

computing means for computing a target value of the valve timing to be controlled, based on one of the angle of the throttle valve and the rotational speed of the engine, wherein the target value is computed so as to increase the length of the valve overlap period when the throttle angle is greater than a predetermined throttle angle and the engine rotational speed is above a predetermined engine rotational speed;

control means for controlling the varying means to continuously alter the valve overlap period of the intake valve and the exhaust valve based on the computed target value; and restricting means for restricting said target value to be computed by said computing means for keeping an amount of exhaust gas returning into the combustion chambers during the valve overlap period less than a predetermined value based on the manifold pressure in the air-intake passage.

2. The apparatus according to claim 1, wherein said varying means includes:

a cam shaft rotatable in association with the crankshaft for actuating at least one of the intake valve and the exhaust valve;

a timing pulley provided on said cam shaft for transmitting torque of the crankshaft to the cam shaft;

a ring gear for coupling the cam shaft to the timing pulley to cause a rotational phase difference between the cam shaft and the timing pulley based on movement of the ring gear in an axial direction thereof; and means for applying a hydraulic pressure to the ring gear to drive the ring gear.

3. The apparatus according to claim 1, wherein said restricting means is arranged to compute a threshold value based on the manifold pressure in the air-intake passage to restrict the uppermost target value therewith.

4. The apparatus according to claim 3, wherein the threshold value serves as an uppermost amount of exhaust gas returning into the combustion chambers during the valve overlap period for preventing occurrence of misfire in the combustion chambers due to a low operational load of the engine.

5. The apparatus according to claim 1, wherein said restricting means restricts said target value based on the value of the manifold pressure for retarding the valve timing to be controlled when the engine is in an idling status, advancing the valve timing to be controlled in accordance with an increase of the engine load when the load of the engine is smaller than a predetermined value, and keeping the valve timing to be controlled constant when the load is in excess of the predetermined value.

6. The apparatus according to claim 1, wherein said computing means, said control means and said restricting means comprise an electronic control unit having an input signal processor, a memory, an operation circuit and an output signal processor.

7. A valve timing control apparatus for an engine having a combustion chamber communicating with an air-intake passage and an air-exhaust passage, said air-intake passage being arranged to introduce air to the combustion chamber through a throttle valve wherein an opening degree of the throttle valve regulates an amount of the air introduced into the combustion chamber, said air-exhaust passage being arranged to exhaust gas from the combustion chamber, wherein the air-intake passage includes an intake valve and wherein the air-exhaust passage, includes an exhaust valve, said intake and exhaust valves alternately and selectively opening and closing, and wherein the intake valve and the exhaust are simultaneously open during a valve overlap period, wherein the intake valve and the exhaust valve are opened and closed in synchronism with a rotation of a crankshalt to selectively open the intake and exhaust passages to the combustion chamber, wherein said apparatus controls at least one of a valve timing of the intake valve and a valve timing of the exhaust valve in accordance with a running condition of the engine, said apparatus comprising:

means for continuously varying at least one of the valve timing of the intake a valve and the valve timing of the exhaust valve;

a first sensor for detecting the opening degree of the throttle valve;

a second sensor for detecting a rotational speed of said engine;

a third sensor for detecting a manifold pressure in said air-intake intake passage;

computing means for computing a target value associated with said valve timing to be controlled, based on the opening degree of the throttle valve and the rotational speed of the engine.

control means for controlling the varying means to continuously alter the valve overlap period of the intake valve and the exhaust valve based on the target value; and restricting means for restricting the target value to be computed by the computing means for keeping an amount of the exhaust gas returning into the combustion chamber during the valve overlap period less than a predetermined value based on the manifold pressure in the air-intake passage.

8. The apparatus according claim 7, wherein said varying means includes:

a cam shaft rotatable in association with the crankshaft for actuating at least one of the intake valve and the exhaust valve;

a timing pulley provided on said cam shaft for transmitting torque of the crankshaft to the cam shaft;

a ring gear for coupling the cam shaft to the timing pulley to cause a rotational phase difference between the cam shaft and the timing pulley based on movement of the ring gear in an axial direction thereof; and means for applying a hydraulic pressure to the ring gear to drive the ring gear.

9. The apparatus according to claim 7, wherein the target value is computed as a value for increasing the valve overlap period when the engine runs with a high load and at a high speed.

10. The apparatus according to claim 7, wherein said restricting means restricts said target value based on the value of the manifold pressure for retarding the valve timing to be continuously varied when the engine is in an idling status, advancing the valve timing to be continuously varied in accordance with an increase of the throttle angle when the throttle angle is smaller than a predetermined value, and keeping the valve timing varied constant when the throttle angle is in excess of the predetermined value.

11. The apparatus according to claim 7, wherein said computing means, said control means and said restricting means comprise an electronic control unit having an input signal processor, a memory, an operation circuit and an output signal processor.

12. The apparatus according to claim 7, wherein the restricting means is arranged to compute an upper limit to which a threshold target value may be set based on the manifold pressure in the air-intake passage.

13. The apparatus according to claim 12, wherein said threshold value serves as an upper limit of the amount of exhaust gas returned into the combustion chambers during the valve overlap period for preventing misfiring in the combustion chambers due to a low operational load of the engine.

14. A valve timing control apparatus for an engine having an air-intake passage for introducing air to a combustion chamber and an air-exhaust passage for exhausting gas from the combustion chamber, wherein the air-intake passage includes an intake valve and wherein the air-exhaust passage includes an exhaust valve therein, said intake and exhaust valves alternately and selectively opening and closing, and wherein the intake valve and the exhaust valve are simultaneously open during a valve overlap period, in synchronism with a rotation of a crankshaft to join the passages with the combustion chamber, wherein said apparatus controls at least one of a valve opening timing of the intake valve and a valve opening timing of the exhaust valve in accordance with a running condition of the engine, said apparatus comprising:

means for continuously varying at least one of the valve timing of the intake valve and the valve timing of the exhaust valve;

a throttle valve disposed in the air-intake passage, for controlling an amount of the air flowing into the combustion chamber;

a first sensor for detecting an angle of the throttle valve;

a second sensor for detecting a rotational speed of the engine;

a third sensor for detecting a manifold pressure in said air-intake passage;

computing means for computing the target value based on at least one of the angle of the throttle valve and the rotational speed of the engine, and wherein said target value is computed as a value for increasing the valve overlap period when the engine runs with a high load and at a high speed;

control means for controlling the varying means to continuously alter the valve overlap period of the intake valve and the exhaust valve based on the computed target valve; and restricting means for restricting said target value to be computed by said computing means for keeping an amount of exhaust gas returning into the combustion chambers during the valve overlap period less than a predetermined value based on the manifold pressure in the air-intake passage.

* * * * *

UNITED STATES PATENT AND TRADEMARK OFFICE
CERTIFICATE OF CORRECTION

PATENT NO. : 5,494,008
DATED : February 27, 1996
INVENTOR(S) : Nobuhisa OHKAWA et al.

It is certified that error appears in the above-indentified patent and that said Letters Patent is hereby corrected as shown below:

| Column | Line | |
|---|---|---|
| 12 | 28 | After "passage" delete ",". |
| 12 | 31 | After "exhaust" insert --valve--. |
| 12 | 52 | After "engine" change "." to --;--. |
| 13 | 20 | After "timing" delete "varied". |

Signed and Sealed this

Twenty-third Day of July, 1996

Attest:

BRUCE LEHMAN

Attesting Officer    Commissioner of Patents and Trademarks